(12) United States Patent
Smadi et al.

(10) Patent No.: US 10,122,184 B2
(45) Date of Patent: Nov. 6, 2018

(54) APPLICATION OF MODULATED VIBRATIONS IN DOCKING SCENARIOS

(71) Applicant: BlackBerry Limited, Waterloo (CA)

(72) Inventors: Mohammed Nawaf Smadi, Ancaster (CA); Jeffrey Ronald Clemmer, New Dundee (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

(21) Appl. No.: 15/266,336

(22) Filed: Sep. 15, 2016

(65) Prior Publication Data

US 2018/0074547 A1 Mar. 15, 2018

(51) Int. Cl.
*H02J 7/00* (2006.01)
*H02K 7/075* (2006.01)
*H02K 41/035* (2006.01)
*H04M 1/725* (2006.01)
*H02K 3/52* (2006.01)

(52) U.S. Cl.
CPC .............. *H02J 7/00* (2013.01); *H02J 7/0044* (2013.01); *H02J 2007/0001* (2013.01); *H02K 3/52* (2013.01); *H02K 7/075* (2013.01); *H02K 41/0356* (2013.01); *H04M 1/7253* (2013.01); *H04M 1/72527* (2013.01)

(58) Field of Classification Search
CPC .... H02J 7/00; H02J 7/0044; H02J 2007/0001; H04M 1/7253; H04M 1/72527
USPC .................................................. 455/572, 573
See application file for complete search history.

(56) References Cited

U.S. PATENT DOCUMENTS

| 6,081,493 | A | * | 6/2000 | Joichi | ................... | G11B 20/06 |
| | | | | | | 329/313 |
| 9,401,621 | B2 | * | 7/2016 | Amano | ................... | H02J 7/025 |
| 2010/0218249 | A1 | * | 8/2010 | Wilson | .................. | H04L 9/3226 |
| | | | | | | 726/19 |
| 2011/0306882 | A1 | * | 12/2011 | Hannon | ............... | A61B 6/4494 |
| | | | | | | 600/443 |

(Continued)

FOREIGN PATENT DOCUMENTS

DE 102013013013 * 2/2015 ............... H04L 9/32

OTHER PUBLICATIONS

Hwang et al.: "Privacy-Aware Communication for Smartphones Using Vibration", School of Electrical Engineering and Computer Science Seoul National University, Seoul, Korea.

(Continued)

*Primary Examiner* — Duc M Nguyen
(74) *Attorney, Agent, or Firm* — Rowand LLP

(57) ABSTRACT

A docking station for electronic devices is disclosed. The docking station includes: a housing defining a docking area for receiving an electronic device; a vibrator for generating vibrations, the vibrator being positioned in the docking station such that vibrations generated by the vibrator are transmitted to at least a part of the electronic device when the electronic device is docked in the docking area; and a controller coupled to the vibrator, the controller being configured to: detect that the electronic device is docked in the docking area; and in response to detecting that the electronic device is docked in the docking area, cause the vibrator to generate vibrations corresponding to a signal representing an identifier of the docking station.

18 Claims, 6 Drawing Sheets

(56) References Cited

U.S. PATENT DOCUMENTS

| | | | | |
|---|---|---|---|---|
| 2012/0023463 | A1* | 1/2012 | Tseng | G01C 21/265 |
| | | | | 715/866 |
| 2013/0080676 | A1* | 3/2013 | Mifsud | G06F 3/0231 |
| | | | | 710/304 |
| 2013/0326104 | A1* | 12/2013 | Strommen | G06F 1/1632 |
| | | | | 710/304 |
| 2014/0039693 | A1* | 2/2014 | Havens | H01R 43/002 |
| | | | | 700/280 |
| 2014/0235166 | A1* | 8/2014 | Molettiere | H04B 7/26 |
| | | | | 455/41.2 |
| 2014/0325113 | A1* | 10/2014 | Frye | G06F 13/4081 |
| | | | | 710/304 |
| 2015/0053006 | A1* | 2/2015 | Decoux | G04D 7/1207 |
| | | | | 73/579 |
| 2015/0098673 | A1* | 4/2015 | Barfoot | G01V 1/001 |
| | | | | 385/13 |
| 2015/0162945 | A1* | 6/2015 | Karlsson | H02J 7/0044 |
| | | | | 455/557 |
| 2016/0153277 | A1* | 6/2016 | Jaaskelainen | E21B 47/0007 |
| | | | | 340/854.7 |
| 2016/0285299 | A1* | 9/2016 | Amand | H02J 7/025 |

OTHER PUBLICATIONS

Roy et al.: "Ripple: Communicating through Physical Vibration", University of Illinois at Urbana-Champaign.
Studer et al.: "Don't Bump, Shake on It: The Exploitation of a Popular Accelerometer-Based Smart Phone Exchange and Its Secure Replacement", ACSAC '11 Dec. 5-9, 2011, Orlando, Florida USA.

* cited by examiner

APPLICATION OF MODULATED VIBRATIONS IN DOCKING SCENARIOS

TECHNICAL FIELD

The present disclosure relates to peripheral devices and, in particular, to docking stations for mobile electronic devices.

BACKGROUND

A docking station for electronic devices is a support structure which may be equipped for various functions, such as device charging and data synchronization between a docked device and an external source (such as a desktop computer). Docking stations are manufactured with specific brands and models of devices in mind, and may include features that are compatible with specific requirements (e.g. connector types, power signaling, etc.) of the docking devices.

Docking stations, like many modern electronic devices, may be capable of wireless communication with remote networks and other devices. For example, a docking station may establish a wireless connection with a docked device to exchange various different types of data with the device. In particular, a docking station may be wirelessly paired with one or more docked devices. In some environments, it may be challenging to correctly pair docked devices to a docking station. For example, in a space that is densely occupied by a plurality of electronic devices (e.g. a large number of devices in close proximity to each other), confusion may arise in determining which devices should be wirelessly paired to a specific docking station. Such confusion may arise, at least in part, due to limitations in short-range communication and detection capabilities of docking stations and/or docking electronic devices.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In an aspect, the present disclosure describes a docking station for electronic devices. The docking station includes: a housing defining a docking area for receiving an electronic device; a vibrator for generating vibrations, the vibrator being positioned in the docking station such that vibrations generated by the vibrator are transmitted to at least a part of the electronic device when the electronic device is docked in the docking area; and a controller coupled to the vibrator, the controller being configured to: detect that the electronic device is docked in the docking area; and in response to detecting that the electronic device is docked in the docking area, cause the vibrator to generate vibrations corresponding to a signal representing an identifier of the docking station.

In another aspect, the present disclosure describes a method for operating a docking station for electronic devices. The method includes: detecting that an electronic device is docked to the docking station; and in response to detecting that the electronic device is docked to the docking station, causing a vibrator of the docking station to generate vibrations corresponding to a signal representing an identifier of the docking station.

In yet another aspect, the present disclosure describes a method of pairing a docking station with an electronic device. The method includes: detecting that the electronic device has docked to the docking station; in response to detecting that the electronic device has docked to the docking station, causing a vibrator associated with the docking station to generate vibrations corresponding to a signal representing an identifier of the docking station; detecting, at the electronic device, the generated vibrations; and demodulating, by the electronic device, the detected vibrations to extract information identifying the docking station.

In yet another aspect, the present disclosure describes a method, implemented by an electronic device, for docking to a docking station. The method includes: detecting vibrations generated by a docking station; demodulating the vibrations to recover an identifier associated with the docking station; establishing a wireless connection with the docking station based on the recovered identifier; and exchanging data with the docking station via the established wireless connection.

Other example embodiments of the present disclosure will be apparent to those of ordinary skill in the art from a review of the following detailed descriptions in conjunction with the drawings.

Figure 1:
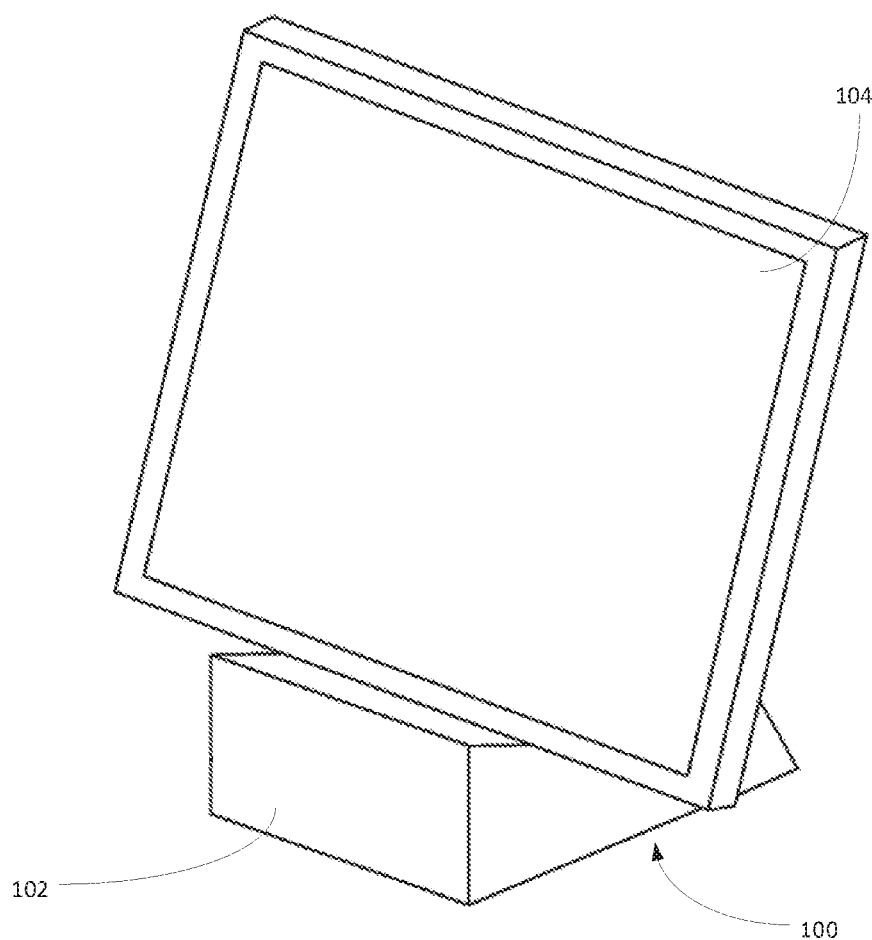
FIG. 1 is an isometric view of an electronic device received in an example docking station, in accordance with example embodiments of the present disclosure.

Reference is now made to FIG. 1, which is an isometric view of an electronic device 104 received in an example docking station 100. The docking station 100 may be designed for use with numerous different types and models of electronic devices. The docking station 100 may be a stand-alone unit or, alternatively, the docking station 100 may be integrated into other devices or systems. For example, the docking station 100 may take the form of, among others, a car mount cradle for mobile devices, a charging stand/pad, or a multimedia system with an integrated dock. In some embodiments, the docking station 100 may be connected to an external computing device, such as a desktop or laptop computer, which may power and/or control the operation of the docking station 100.

The docking station 100 includes a housing 102. In at least some embodiments, the housing 102 serves as a support structure for an electronic device. That is, when an electronic device is docked to (e.g. mounted on or connected to) the docking station 100, the housing 102 may provide structural support for the docked electronic device. The docking station 100 may provide numerous functionalities which are additional to or complementary with those of a docked electronic device, including, but not limited to: wired or wireless charging; data synchronization; supplementary video/audio output interfaces; connections to other systems, devices (e.g. a computer, a power source), or peripherals (e.g. a monitor, a keyboard, external speakers, etc.); wireless network connectivity; and cable connection interfaces (e.g. USB ports).

The housing 102 defines a docking area for receiving one or more electronic devices. In at least some embodiments, the housing 102 may include a support surface or seat on which a docked electronic device can rest. For example, the housing 102 may include an angled wall which supports a docked electronic device in a generally upright position to facilitate convenient viewing and input by a user of the electronic device. In particular, a rear surface of a docked electronic device may rest against a support surface of the housing 102. More generally, at least a portion of a docked electronic device may come into direct physical contact with the housing 102. In some embodiments, the docking station 100 may define a cavity for receiving at least a portion of an electronic device. For example, the housing 102 may include a cavity which is dimensioned and shaped to receive one end of a docking electronic device when the electronic device is partially inserted into the cavity. The cavity may, for example, be in the form of a channel or a well that is defined in the housing 102. The docking station 100 may also include one or more retention mechanisms, such as snaps, latches, etc., for securing a docked electronic device to the housing 102.

Figure 2:
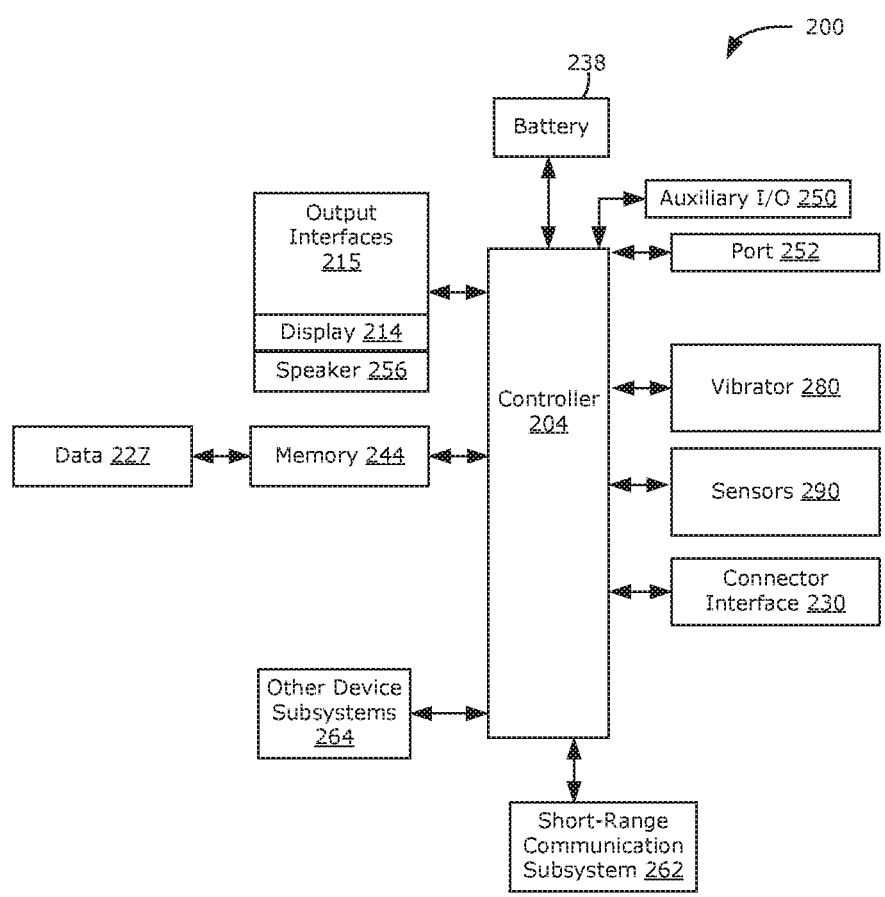
FIG. 2 is a block diagram of an example docking station, in accordance with example embodiments of the present disclosure.

Reference is now made to FIG. 2, which is a block diagram of an example docking station 200. In at least some embodiments, the docking station 200 includes one or more connector interfaces 230 for operatively engaging a port of a docking electronic device. For example, the docking station 200 may include a data and power connector, such as a Lightning™ connector manufactured by Apple Inc., disposed in a docking area of the housing. In particular, the connector interface 230 may be a male connector that is configured to interface with and detachably connect to a female receptacle of a docking device. The connector interface 230 may be positioned on the housing such that the connector interface engages a port of a docked device. For example, the connector interface 230 may be located in a well that is defined in the housing of the docking station 200. The connector interface 230 may carry digital signals and support, among others, data exchange and device charging.

The docking station 200 includes a controller 204. The controller 204 may include one or more processors (such as a microprocessor) which control the overall operation of the docking station 200. The controller 204 is communicably coupled with additional device subsystems, including one or more output interfaces 215 (e.g. a display 214, speakers 256), one or more input interfaces (e.g. control panel and/or buttons, a keyboard, a touch-sensitive overlay), memory 244 (e.g. flash memory, random access memory, read-only memory) auxiliary input/output (110) subsystems 250, a charging/data port 252 (which may be serial data ports, such as Universal Serial Bus (USB) ports, video input/output port, audio input/output port, Ethernet port, etc.), a short-range communication subsystem 262 (which may include a near-field communications (NFC) subsystem), and other device subsystems generally designated as 264. Some of the subsystems shown in FIG. 2 perform communication-related functions, whereas other subsystems may provide "resident" or on-device functions.

The docking station 200 includes a vibrator 280. The vibrator 280 is configured to generate and transmit vibrations. In particular, the vibrator 280 may include a drive mechanism and a vibrating member coupled to the drive mechanism. The drive mechanism may generate vibrations and the vibrating member may be configured to transmit the generated vibrations to different parts of the housing. The vibrator 280 may be integral with the docking station 200 or it may be a stand-alone unit (e.g. add-on component) that is coupled to the docking station 200. More specifically, the vibrator 280 is positioned in the docking station 200 such that the vibrations generated by the vibrator 280 are transmitted to at least a part of a device that is docked in the docking area of housing. In some embodiments, the vibrator 280 may be disposed in the docking station 200 such that it makes direct physical contact with a docked electronic device. For example, the vibrator 280 may comprise the connector interface 230 and a drive coupled to the connector interface 230. As a further example, the vibrator 180 may be coupled to a docking surface of the docking station 200. Alternatively, at least a portion of the housing may be interposed between the vibrator 280 and a docked electronic device, where the interposed portion comprises a material or medium which allows vibrations generated by the vibrator 280 to be transmitted to the docked electronic device. For example, a wall or surface (e.g. seat) of the housing which supports a docked device may be caused to vibrate by the vibrator 280. More generally, the vibrator 280 may cause all or a portion of the housing of the docking station to vibrate in a regulated manner.

In at least some embodiments, the vibrator 280 comprises a vibration motor. A vibration motor is an electro-mechanical device that moves a metallic mass around a neutral position in order to generate vibrations. The vibration motor may be based on a device which uses an eccentric rotating mass (ERM) or a linear resonant actuator (LRA). An ERM uses a DC motor to rotate an eccentric mass around an axis of rotation; as the mass is not symmetric with respect to the axis, rotation of the mass causes vibrations. For ERMs, the rotational speed of the motor is controlled through an input DC voltage. An LRA, on the other hand, generates vibrations as a result of the linear movement of a magnetic mass. A magnetic field is generated by a coil ("voice coil") which interacts with a magnetic mass which is suspended on a spring. As the magnetic field varies with applied AC current, the magnet and the mass are moved linearly as they interact with the spring.

The vibrator 280 is coupled to the controller 204. In particular, the controller 204 may be configured to regulate the supply of power (i.e. DC or AC) to a motor driving the vibrator 280. In some embodiments, the vibrator 280 may include an integrated driver circuit for a vibration motor. A dedicated motor drive integrated circuit can provide the vibration motor with required levels of voltage and current, connect the vibration motor to a main power source, and use drive signals from the controller 204 to control the vibration motor. The vibrator 280 may comprise additional circuitry, including one or more transistors for current amplification.

The docking station 200 may expand the output capabilities of a docked electronic device, by coupling the docked electronic device with additional display and audio output interfaces. In some embodiments, the docking station 200 may include a display 214. The display 214 may be an internal display (that is, the display 214 may be a component of the docking station 200) or it may be externally connected to the docking station 200. The display 214 may, for example, be a touchscreen display which acts as both an input interface (i.e. touch-sensitive overlay) and an output interface (i.e. display). The touchscreen display may be constructed using a touch-sensitive input surface which is connected to an electronic controller and which overlays the display 214. The touch-sensitive overlay and the electronic controller provide a touch-sensitive input interface and the controller 204 interacts with the touch-sensitive overlay via the electronic controller. In some embodiments, the docking station 200 may include one or more speakers 256. The speakers 256 may, for example, be disposed in spaced relation to one another. In particular, the docking station 200 may include two speakers which are spatially separated from each other within the docking station 200. Each speaker 256 may, for example, be associated with a separate audio channel. The speakers 256 may, for example, be used to provide stereophonic sound (also referred to as stereo).

The docking station 200 includes a short-range communication subsystem 262 which provides for wireless communication between the docking station 200 and other electronic devices. The short-range communication subsystem 262 may be configured to allow the docking station 200 to communicate with one or more docking electronic devices. In some embodiments, the short-range communication subsystem 262 is a wireless bus protocol compliant communication mechanism such as a Bluetooth™ communication module to provide for communication with similarly-enabled devices. The docking station 200 may include an NFC subsystem, which is configured to communicate with other electronic devices and/or tags, using an NFC communications protocol. For example, the short-range communication subsystem 262 may comprise an NFC subsystem. NFC is a set of short-range wireless technologies which typically require a distance of 4 centimeters or less for communication. The NFC subsystem may include, at least, an NFC chip and an NFC antenna.

In at least some embodiments, the docking station 200 may include one or more sensors 290. For example, the docking station 200 may include a proximity sensor and/or an orientation sensor. The proximity sensor can include an infrared light source, a sensor that receives infrared light, and associated circuits and components. The proximity sensor is associated with the controller 204 so that the controller can evaluate the received or measured infrared light. Infrared light can be emitted from the infrared light source and can then be reflected off of objects proximal to the proximity sensor and received by the sensor. The proximity sensor may be positioned in the docking station 200 so as to enable detection of objects (i.e. electronic devices) that are docked to or approaching the docking area of the housing.

The docking station 200 also includes or is connectable to a power source, such as a battery 238. The battery 238 may be one or more rechargeable batteries that may be charged, for example, through charging circuitry coupled to a battery interface, such as a data or power port associated with the docking station 200. The battery 238 provides electrical power to at least some of the electrical circuitry in the docking station 200.

The docking station 200 may store data 227 in the memory 244, which in one example embodiment, is an erasable persistent memory such as flash memory. In various example embodiments, the data 227 includes, without limitation: one or more identifiers of the docking station (e.g. MAC address, IP address, hardware serial number); a database of previously docked devices; and a database of discovered devices. The data 227 stored in the persistent memory (e.g. flash memory) of the docking station 200 may be organized, at least partially, into one or more database or data stores.

Pairing a Docking Station with an Electronic Device

Figure 3:
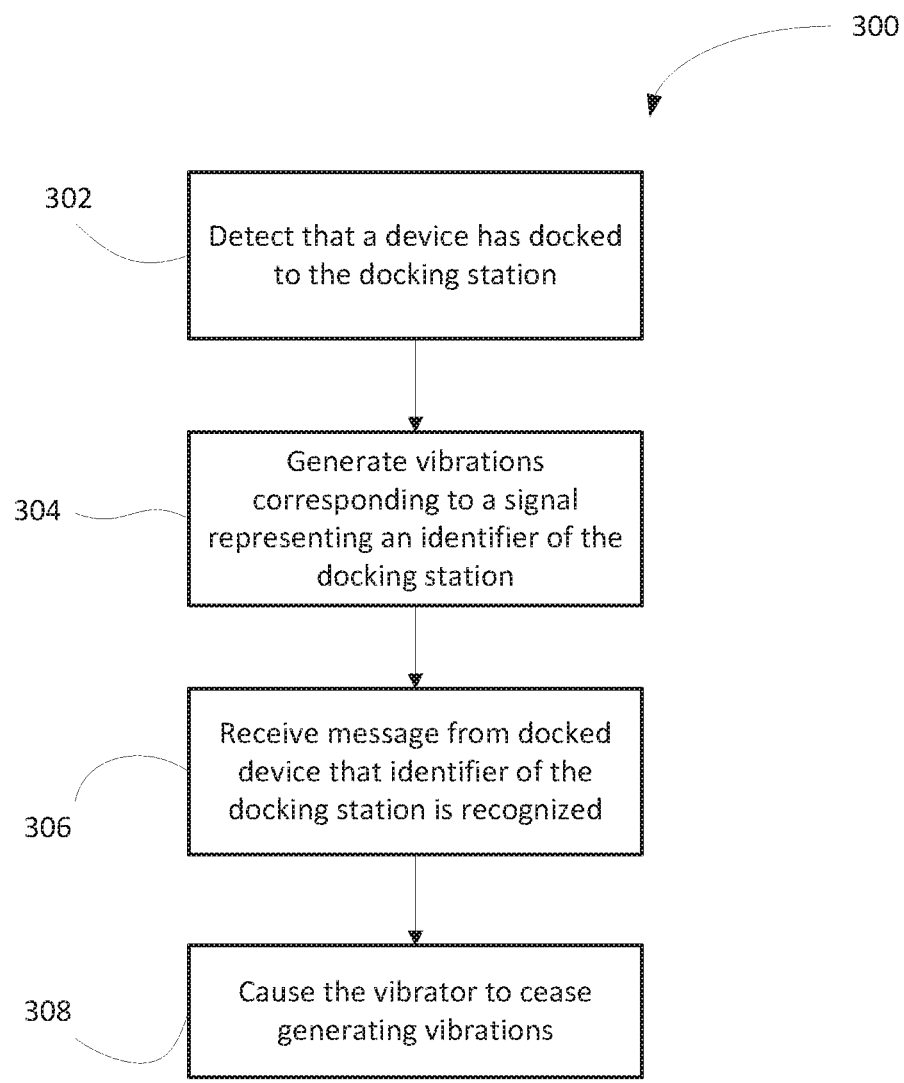
FIG. 3 shows, in flowchart form, an example method for operating a docking station, in accordance with example embodiments of the present disclosure.

Reference is now made to FIG. 3, which shows, in flowchart form, an example method 300 for operating a docking station for electronic devices, such as the docking station 200 of FIG. 2. In at least some embodiments, the method 300 may be performed by a controller associated with a docking station, such as controller 204 of FIG. 2. In particular, the method 300 may be implemented by one or more processors that are configured to control the overall operation of a docking station.

A docking station may be equipped for wireless exchange of data with one or more electronic devices. In particular, a docking station may be paired with a docked electronic device using Bluetooth™ or another wireless protocol. The pairing process may be completed once in order to establish a relationship between the docking station and a docked device. After the pairing process is completed, the docking station and the docked device have a relationship in which they are able to perform more advanced communications with one another. Some docking stations include output interfaces which may be accessed by an electronic device for the purpose of outputting data that is associated with the electronic device. For example, a docked electronic device may, after establishing a wireless connection with a docking station, transmit video or image data to the docking station to be displayed on a display interface of the docking station. As a further example, a docking station may receive audio data (e.g. music files) from a docked electronic device to be output via one or more speakers of the docking station. More generally, a docked electronic device may be permitted to access and/or control one or more resources associated with the docking station after the device and the docking station have been paired.

When a docking station is attempting to pair with a docked device, a short-range communication module of the docking station may discover the docked device (or vice versa) using a wireless protocol. However, in certain environments which have a high density of docks and/or docking devices, correct pairing of docks to docking devices may be challenging. In particular, a docking station may pair with a device which is not docked to the docking station. For example, a docking station may pair with a device which is docked to a different docking station or to a device which is not docked at all (e.g. a mobile device which is only temporarily detected by the docking station via Bluetooth™ or NFC). This type of erroneous pairing of a docking station to a device may produce undesirable results, such as exchange of confidential or sensitive data between an undocked device and a docking station, transmission of a device's output data to an incorrectly identified docking station, and/or an overburdening of resources associated with a single docking station.

The present disclosure proposes techniques of using vibratory communication to establish pairings of docking stations and docked devices to facilitate wireless exchange of data. According to example embodiments, a docking station (or at least part of a docking station) may be configured to generate and transmit modulated vibrations to one or more docked devices, where the vibrations correspond to a signal that represents an identifier of the docking station. That is, the vibrations generated by a docking station convey identifying information about the docking station to the docked devices. The docked devices may detect and demodulate the vibrations to extract information identifying the docking station. In particular, a docked device may establish a wireless connection with a docking station based on the identifying information recovered from the demodulated vibrations.

In operation 302, the docking station detects that an electronic device has docked to the docking station. More specifically, a controller of the docking station determines that an electronic device has docked to a docking area of the docking station. In at least some embodiments, the controller may determine that an electronic device has docked to the docking station based on detecting that a connector interface of the docking station has engaged a port of the electronic device. For example, the controller may detect the presence of a mechanical and/or electrical connection between a connector (such as a Micro-USB or USB Type-C connector) of the docking station and a data and/or power port of an electronic device, and in response, determine that the electronic device has docked to the docking station. More generally, the controller may determine that a device has docked to the docking station upon detecting a mating of an electronic connector of the docking station with a complementary receptacle (e.g. port, socket) associated with the electronic device.

In some embodiments, the docking station may be configured to detect placement of an electronic device on a receiving surface of the docking station, without the use of connectors. For example, the docking station may be equipped with one or more electrical contacts (and more generally, one or more conductive elements) that are positioned on an exterior surface, such as a docking area, of the docking station, for interfacing with electrical contacts associated with an electronic device. When the electrical contacts come in contact, forming a closed switch, the controller may detect that an electronic device has docked.

As another example, the docking station may be enabled for power and data transfer via inductive coupling. More specifically, the docking station may include a magnetic coil or other inductive mechanism for transforming signals (e.g. power and/or data signals) into a magnetic field, which can be detected by a corresponding coil or inductive receiving component of a docking electronic device. For example, the docking station may implement inductive electrical power transfer based on the Qi™ standard developed by the Wireless Power Consortium. The controller of the docking station may determine that a device has docked upon detecting close spacing of the inductive coils of the docking station and those of the device (for example, prior to initiating inductive power transfer). That is, a docking scenario may be determined upon detecting an inductive coupling of the coils of the docking station and those of an electronic device.

As yet another example, in some embodiments, one or more sensors associated with the docking station may be used to detect a device docking scenario. For example, a proximity sensor may be positioned in the housing of the docking station as to be able to detect the presence of an electronic device in a docking area of the docking station. Alternatively, in some embodiments, a user may manually indicate that a device has docked to a docking station. For example, after placing a device in a docking area of the docking station, a user may specify (via an input interface associated with the docking station) that the device has docked to the docking station.

In response to detecting that the electronic device has docked in the docking area of the docking station, the controller causes a vibrator associated with the docking station to generate vibrations corresponding to a signal representing an identifier (e.g. unique identifier) of the docking station, in operation 304. The identifier of the docking station may, for example, be a media access control (MAC) address or an Internet Protocol (IP) address associated with the docking station. The identifier may, in some embodiments, be a device serial number or any other hardware ID associated with the docking station.

The vibrator of the docking station may be a vibration motor, such as an ERM or an LRA. Numerous techniques for generating vibrations to transmit digital signals may be available to be implemented by the vibrator of the docking station. In at least some embodiments, vibrations can be generated to encode data via a modulation technique, such as on-off keying. An input string, such as an identifier of a docking station, or any bit stream message is split into characters, and each character is converted into ASCII codes. Each ASCII code is then converted into a sequence of binary codes. Vibrations are generated based on each binary code in the sequence, transmitting each bit in the code. For example, a vibration impulse may be transmitted by the vibrator to represent a bit 1. The presence of a vibration for a specific duration represents a binary 1, while its absence for the same duration represents a binary 0. In this way, each binary sequence may be encoded and transmitted by vibrations generated by the vibrator of the docking station.

Another technique for vibratory communication includes regulating the voltage that is supplied to the vibration motor (or other drive mechanism) of the docking station. In particular, the frequency and/or amplitude of vibration may be controlled through a time-varying sequence of voltage levels provided to the vibration motor. For example, the vibration motor may be powered by a DC (or AC) power supply and a controller (such as a micro-controller) may operate a switch to regulate the voltage fed to the vibration motor. In some embodiments, pulse width modulation (PWM) may be used to drive the vibration motor, and in particular, to control the vibration motor's speed and frequency of vibration. That is, a controller may be configured to change the voltage applied to a vibration motor using a PWM signal. For example, controlling the speed of motor and the vibration frequency/amplitude may be achieved by altering a PWM signal's duty cycle in the controller. In at least some embodiments, the controller may be coupled with additional circuitry to fulfil the vibration motor's power requirements (for example, to amplify the PWM signal).

In at least some embodiments, in order to signal to a docked device that vibrations are being generated by the docking station, one or more pilot vibrations may be transmitted to the docked device. In particular, the docking station may indicate, via a pilot signal, to the docked device that there is an incoming encoded message. For example, an encoded beacon signal may be transmitted via vibrations generated by the docking station, to notify a receiver of the docked device to start decoding the ensuing vibrations.

Various modulation techniques, such as amplitude modulation, amplitude-shift keying (ASK), frequency-shift keying (FSK), quadrature amplitude modulation (QAM), phase-shift keying (PSK), pulse amplitude modulation (PAM), pulse-position modulation (PPM), etc., may be employed to encode information to be transmitted through vibrations generated by the docking station. In particular, the input voltage levels supplied to a vibration motor can be varied to achieve different vibration amplitudes and/or frequencies according to modulated (vibration) carrier signals. The modulated vibrations may encode a bit stream message, such as a unique identifier of a docking station. For example, in the case of amplitude modulation, each amplitude level, corresponding to a specific voltage level, may serve as a separate symbol. More generally, a finite number of amplitudes may each be assigned a unique pattern of binary digits, and each amplitude may encode an equal number of bits.

In some embodiments, the vibrations corresponding to a signal representing an identifier of the docking station may be generated and transmitted only once (i.e. only one time after detection of a docked electronic device) or another predefined number of times. Alternatively, the vibrations may be generated on an on-going basis, for example, at predetermined time intervals. For example, the same vibration pattern may be repeatedly generated by the docking station and transmitted to a docked electronic device at fixed time intervals.

Once the vibrator of the docking station generates the modulated vibrations, the vibrations may be detected by a docked electronic device. In operation 306, the controller of the docking station may receive a confirmation message from a docked electronic device, indicating that an identity of the docking station has been recognized by the device. For example, the confirmation message from the docked electronic device may include the identifier (e.g. MAC address), or a hash value of the identifier, of the docking station, and indicate that the identifier was derived from demodulating the detected vibrations. In some embodiments, instead of or in addition to a confirmation message, the controller may receive a wireless connection request from the docked electronic device. In particular, the docked electronic device may pair with the docking station by establishing a connection based on the identity of the docking station. In response to receiving a confirmation message or a connection request from a docked device, or in response to establishing a wireless pairing between a docked device and the docking station, the controller may cause the vibrator to cease generating vibrations, in operation 308.

Figure 4:
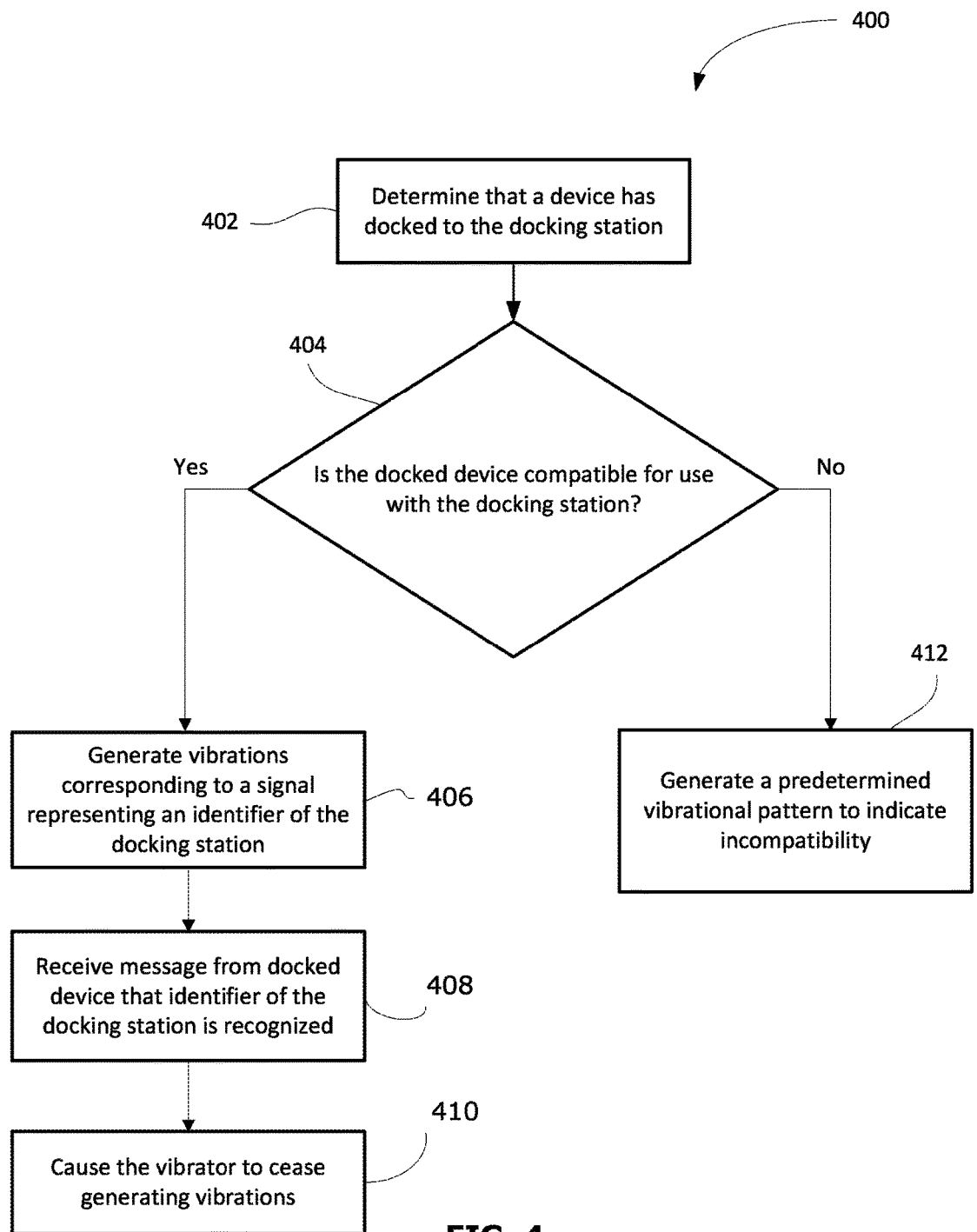
FIG. 4 shows, in flowchart form, another example method for operating a docking station, in accordance with example embodiments of the present disclosure.

Reference is now made to FIG. 4, which shows, in flowchart form, another example method 400 for operating a docking station for electronic devices, such as the docking station 200 of FIG. 2. In at least some embodiments, the method 400 may be performed by a controller associated with a docking station, such as controller 204 of FIG. 2. In particular, the method 400 may be implemented by one or more processors that are configured to control the overall operation of a docking station.

In operation 402, which corresponds to operation 302 in method 300 of FIG. 3, the controller of the docking station determines that an electronic device has docked to a docking area of the docking station. In operation 404, the controller determines whether the docked electronic device is compatible for use with the docking station. The controller may, in some embodiments, determine whether the docked device is of a type or model that is compatible with the docking station. A docking station may not support use with all electronic devices. For example, a docking station produced by a certain manufacturer may not be compatible for use with devices produced by a different manufacturer. In particular, the functionalities which are provided by the docking station (e.g. charging, output interfaces such as a display or speakers, etc.) may only be supported for a limited selection of devices. For example, the docking station and the docked device may implement different and incompatible technologies for, among others, charging, wireless connectivity, data transmission, video and/or audio playback, etc. If a device is placed on a docking surface (i.e. docking area) or if a power/data connector of a docking station is connected to a port of a device, the controller may be configured to first determine whether the docked device is compatible for use with the docking station.

If the device is compatible with the docking station, method 400 proceeds in a similar manner as method 400. Specifically, in operation 406, the controller causes a vibrator associated with the docking station to generate vibrations corresponding to a signal representing an identifier of the docking station. In operation 408, the controller receives a confirmation message from the docked device, indicating that an identity of the docking station has been recognized by the device, and the vibrations are caused to cease in operation 410.

If, however, the controller determines that the docked device is not compatible with the docking station, in operation 412, the controller may cause a different pattern of vibrations to be generated in order to notify the docked device of the incompatibility. For example, a fixed vibrational pattern may be transmitted to the docked device. The fixed pattern may be a generic pattern indicating incompatibility, or the fixed pattern may correspond to the particular type of incompatibility between the docking station and the docked device. For example, a range of vibrational patterns signifying different types of incompatibility may be stored in a memory associated with the docking station, and the appropriate vibrational pattern may be selected for transmission to the docked device in operation 412.

This vibrational pattern may be generated only once, another predefined number of times, or it may be generated on an on-going basis at predetermined time intervals until the docked device is removed from the docking station. In some embodiments, a vibrational pattern may be generated to indicate an improper or incomplete docking scenario. For example, if the connector of the docking station and a port of the docking electronic device are misaligned or incompletely connected, the controller may cause the vibrator to produce a predetermined vibrational pattern in operation 412. The fixed vibrational pattern may cease once the docked device is suitably connected or removed entirely from the docking station.

Example System for Docking an Electronic Device

Figure 5:
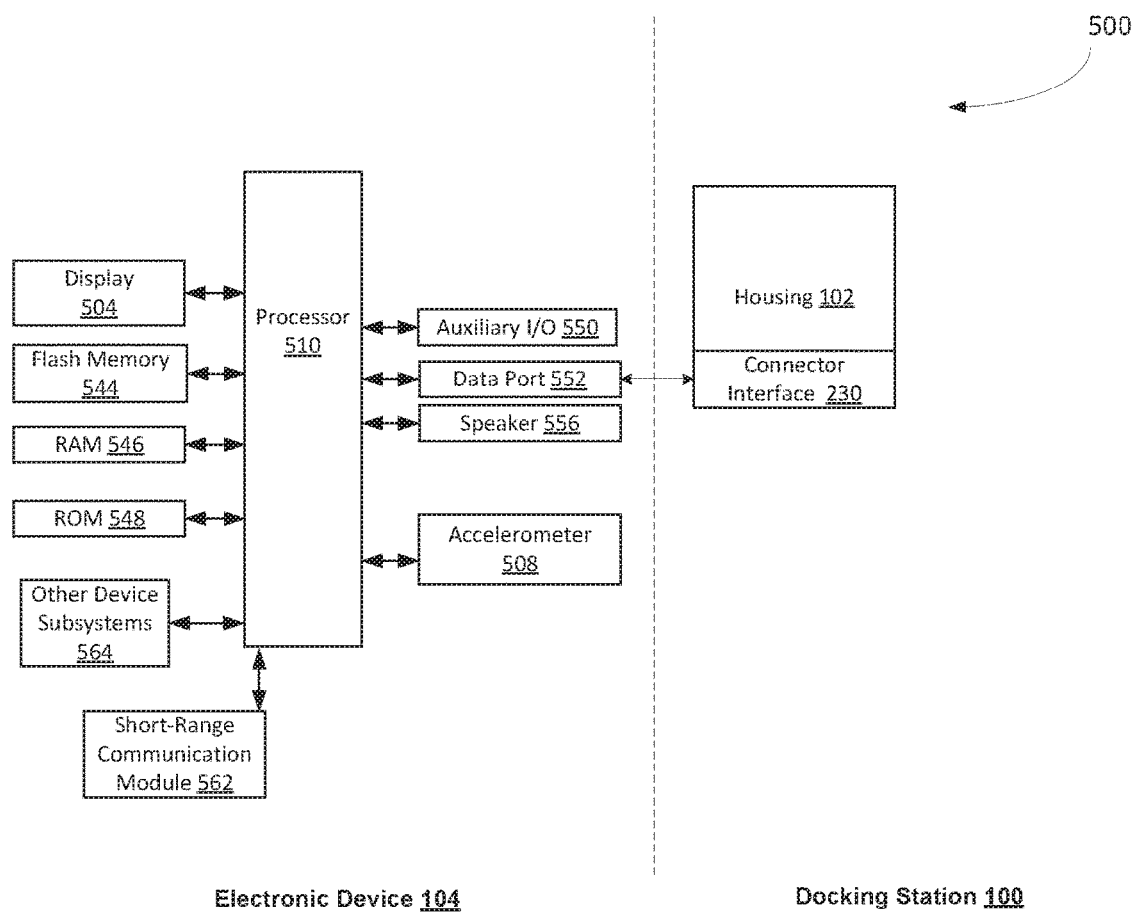
FIG. 5 is a schematic diagram of an example system for docking an electronic device, in accordance with example embodiments of the present disclosure.

Reference is now made to FIG. 5, which shows a schematic diagram of an example system 500 for docking an electronic device. The system 500 includes a docking station 502 and an electronic device 504. The electronic device 504 may take a variety of forms; for example, the electronic device 504 may be a smartphone, a tablet computer, a laptop, a wearable computer (such as a smartwatch), or a PDA (personal digital assistant). The electronic device 504 is compatible for use with the docking station 502. In particular, the electronic device 504 is capable of docking to the docking station 502 (for example, via a connection between connector interface 580 of the docking station 502 and data port 552 of the electronic device 504), and is equipped for wireless communication with the docking station 502.

The electronic device 504 includes a sensor for detecting vibrations which, in the illustrated embodiment of FIG. 5, is an accelerometer 508. The accelerometer 508 is a device which generates an output signal in dependence on the acceleration of the accelerometer 508. That is, the accelerometer produces an output which reflects the acceleration of the accelerometer. More particularly, the accelerometer 508 may generate an output which specifies the magnitude and/or direction of acceleration. In the embodiment illustrated, since the accelerometer 508 is integrated within the electronic device 504, the accelerometer 508 effectively measures the acceleration of the electronic device 504. In some embodiments, the accelerometer 508 may be a digital accelerometer provided in an integrated circuit (IC) having a memory, such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 504.

The accelerometer 508 includes one or more sensing axes. For example, the accelerometer 508 may include three orthogonal sensing axes, $A_x$, $A_y$ and $A_z$. Each sensing axis is orthogonal to the other sensing axes. The accelerometer 508 may produce an accelerometer reading for each of the sensing axes, $A_x$, $A_y$ and $A_z$. For example, an accelerometer reading $a_x$ may be produced by the accelerometer 508 based on accelerometer measurements associated with the x sensing axis (such as acceleration along the x sensing axis), an accelerometer reading $a_y$ may be produced by the accelerometer 508 based on accelerometer measurements associated with the y sensing axis (such as an acceleration along the y sensing axis), and an accelerometer reading $a_z$ may be produced by the accelerometer 508 based on accelerometer measurements associated with the z sensing axis (such as an acceleration along the z sensing axis). These accelerometer readings collectively form the accelerometer output. That is, the accelerometer output is an electronic signal which is representative of the accelerometer readings, $a_x$, $a_y$, $a_z$ for the sensing axes $A_x$, $A_y$ and $A_z$ of the accelerometer 508.

The electronic device 504 includes a controller, including at least one processor 510 (such as a microprocessor), which controls the operation of the electronic device 504. The processor 510 interacts with device subsystems, such as one or more input interfaces (including sensors such as a gyroscope, the accelerometer 508, a magnetometer, etc.), flash memory 544, random access memory (RAM) 546, read-only memory (ROM) 548, auxiliary input/output (I/O) subsystems 550, one or more data/charging ports 552, one or more output interfaces (such as speakers 556), a short-range communication module 562, and other device subsystems generally designated as 564. The short-range communication module 562 provides for communication between the electronic device 504 and other systems or devices, which need not necessarily be similar devices. Both the accelerometer 508 and short-range communication module 562 are coupled to the processor 510.

Figure 6:
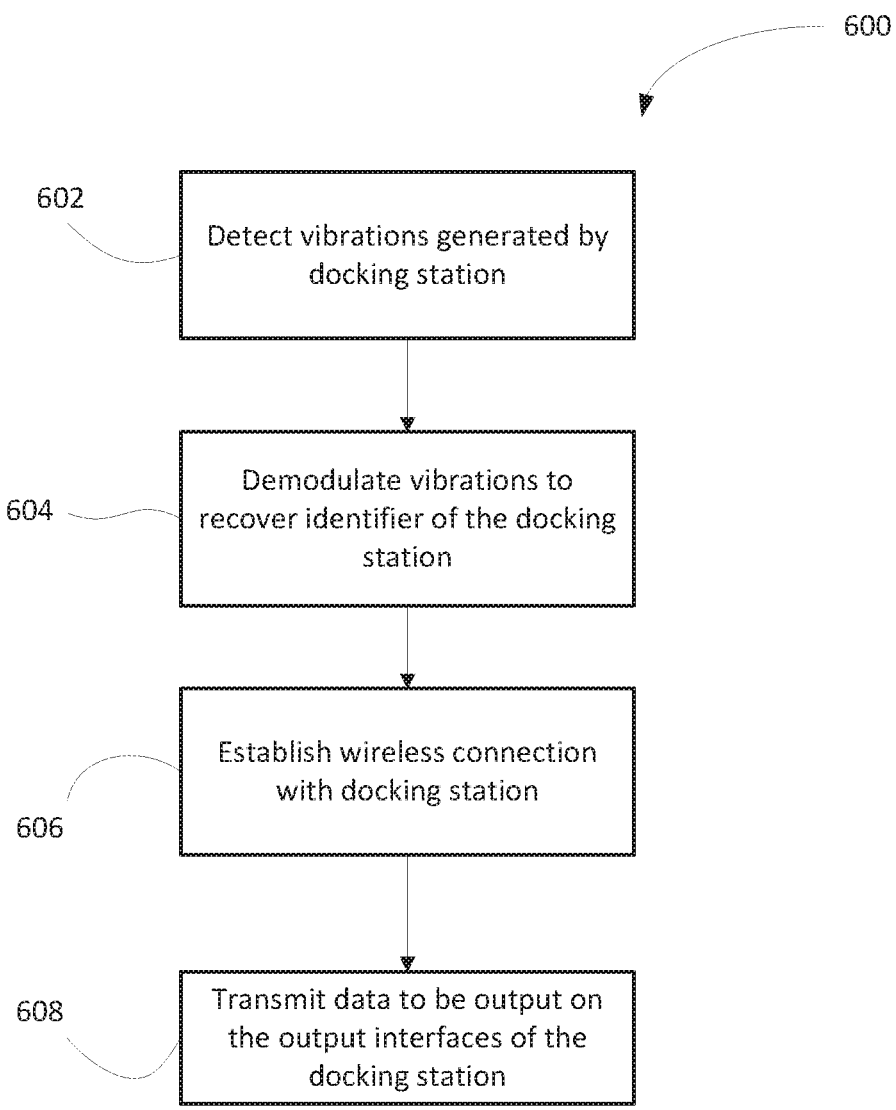
FIG. 6 shows, in flowchart form, an example method for docking to a docking station, in accordance with example embodiments of the present disclosure.

Reference is now made to FIG. 6, which shows, in flowchart form, an example method 600 performed by an electronic device for docking to a docking station. The method 600 may be implemented by a device such as electronic device 504 in system 500 of FIG. 5. In particular, the method 600 may be implemented by a controller, such as one or more processors, associated with an electronic device. In at least some embodiments, the method 600 may be performed by an electronic device after the device has docked to a docking station. In particular, an electronic device may carry out one or more operations of the method 600 after a processor associated with the electronic device detects a docking scenario between the electronic device and a docking station.

In operation 602, the electronic device detects vibrations generated by the docking station to which the device has docked. The vibrations may be generated by the docking station, for example, in accordance with operation 304 in method 300 of FIG. 3. That is, the vibrations may correspond to a signal representing an identifier (e.g. MAC address) of the docking station. The electronic device may detect the vibrations generated by the docking station, based on output from an accelerometer associated with the device. For example, the vibrations may be detected on one or more of the x, y, and z sensing axes of an accelerometer of the electronic device. By sampling the accelerometer output data at appropriate times, the electronic device may detect vibrational movements. In at least some embodiments, calibration of the accelerometer of the electronic device may be performed prior to a docking in order to enable accurate detection of the presence of vibrations. For example, calibration may allow for converting raw accelerometer data from an accelerometer of the electronic device into a standard unit, based on device-specific parameters.

In operation 604, the detected vibrations are demodulated by a controller, such as a processor, associated with the electronic device to recover the signal/message encoded in the modulated vibrations. In particular, the vibrations may be demodulated to extract an identifier of the docking station which generated the vibrations. For example, the decoded signal/message may be processed by the electronic device (e.g. conversion from binary data to ASCII code) to determine an identifier associated with the received signal/message.

In operation 606, the electronic device may use the identifying information for the docking station to establish a wireless connection with the docking station. For example, the electronic device may initiate a wireless connection request with the docking station based on a MAC address recovered from the demodulated vibrations. In some embodiments, a memory associated with the electronic device may store (for example, in a database) various information corresponding to one or more docking stations. For example, information relating to docking stations to which the electronic device had previously docked or detected may be saved in a database that is accessible to the electronic device. Examples of information associated with the one or more docking stations may include: docking station identifiers (e.g. type, model, etc.); last time of docking; available output interfaces; and connection/docking/charging protocol.

In operation 608, the electronic device may exchange data with the docking station via the established wireless connection. For example, the electronic device may transmit video image or audio data to the docking station to be output via one or more output interfaces of the docking station.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:
1. A docking station for electronic devices, comprising:
   a housing defining a docking area for receiving an electronic device and a docking surface for supporting the electronic device in the docking area;
   a vibrator for generating vibrations, the vibrator being positioned in the docking station and coupled to the docking surface such that vibrations generated by the vibrator are transmitted to at least a part of the electronic device when the electronic device is docked in the docking area; and a controller coupled to the vibrator, the controller being configured to:
    detect that the electronic device is docked in the docking area;
    determine that the docked electronic device is compatible for use with the docking station; and
    in response to detecting that the electronic device is docked in the docking area and that the docked electronic device is compatible for use with the docking station, cause the vibrator to generate modulated vibrations encoding an identifier of the docking station.

2. The docking station of claim 1, further comprising a connector interface for operatively engaging a port of the electronic device.

3. The docking station of claim 2, wherein the vibrator comprises the connector interface.

4. The docking station of claim 1, wherein the signal comprises a bit stream message.

5. The docking station of claim 1, wherein the vibrator makes direct physical contact with the electronic device when the electronic device is docked in the docking area.

6. The docking station of claim 1, wherein the housing includes a wall for supporting the electronic device in a generally upright position when the electronic device is docked in the docking area and wherein the vibrator is configured to cause the wall to vibrate.

7. The docking station of claim 1, wherein the vibrator comprises a vibration motor connected to a power supply and wherein the controller is configured to control the vibration motor.

8. The docking station of claim 1, wherein the identifier is a media access control (MAC) address of the docking station.

9. The docking station of claim 1, wherein the signal represents a hash value of an identifier of the docking station.

10. The docking station of claim 1, further comprising a wireless communication subsystem coupled to the controller, wherein the controller is further configured to:
    receive, from the electronic device, a message confirming that an identity of the docking station has been recognized by the electronic device; and
    in response to receiving the message, cause the vibrator to cease generating vibrations.

11. The docking station of claim 1, further comprising a memory, wherein the identifier is stored in the memory.

12. The docking station of claim 1, wherein the controller causes the vibrator to generate the vibrations at predetermined time intervals.

13. A processor-implemented method of operating a docking station for electronic devices, the docking station including a housing defining a docking surface for supporting a docked electronic device, the method comprising:
    detecting that an electronic device is docked to the docking station;
    determine that the docked electronic device is compatible for use with the docking station; and
    in response to detecting that the electronic device is docked to the docking station and that the docked electronic device is compatible for use with the docking station, causing a vibrator of the docking station to generate modulated vibrations encoding an identifier of the docking station,
    wherein the vibrator is coupled to the docking surface.

14. The method of claim 13, wherein the signal comprises a bit stream message.

15. The method of claim 13, wherein the identifier is a media access control (MAC) address of the docking station.

16. The method of claim 13, wherein the signal represents a hash value of an identifier of the docking station.

17. The method of claim 13, further comprising:
    receiving, from the electronic device, a message confirming that an identity of the docking station has been recognized by the electronic device; and
    in response to receiving the message, causing the vibrator to cease generating vibrations.

18. The method of claim 13, wherein the vibrator is caused to generate the vibrations at predetermined time intervals.

* * * * *